US006854647B2

(12) United States Patent
Collins, Jr. et al.

(10) Patent No.: US 6,854,647 B2
(45) Date of Patent: Feb. 15, 2005

(54) CHECKOUT DEVICE INCLUDING INTEGRATED BARCODE READER, SCALE, AND EAS SYSTEM

(75) Inventors: Donald A. Collins, Jr., Atlanta, GA (US); Daniel B. Seevers, Lawrenceville, GA (US); Wayne L. Orwig, Dacula, GA (US); Scott B. Henry, Loganville, GA (US)

(73) Assignee: NCR Corporation, Dayton, OH (US)

( * ) Notice: Subject to any disclaimer, the term of this patent is extended or adjusted under 35 U.S.C. 154(b) by 86 days.

(21) Appl. No.: 10/061,381

(22) Filed: Feb. 1, 2002

(65) Prior Publication Data

US 2003/0146278 A1 Aug. 7, 2003

(51) Int. Cl.[7] .............................................. G06K 15/00
(52) U.S. Cl. ............. 235/383; 235/462.01; 235/462.13; 235/462.14
(58) Field of Search ............................ 235/383, 462.01, 235/462.13, 462.14, 462.35, 385, 379, 382, 462.15; 186/59, 61

(56) References Cited

U.S. PATENT DOCUMENTS

| 4,141,078 A | | 2/1979 | Bridges, Jr. et al. | |
|---|---|---|---|---|
| 4,575,624 A | | 3/1986 | Klinkhardt | |
| 5,059,951 A | | 10/1991 | Kaltner | |
| 5,341,125 A | * | 8/1994 | Plonsky et al. | 340/572.3 |
| 5,376,923 A | * | 12/1994 | Kindschy | 219/227 |
| 5,377,269 A | * | 12/1994 | Heptig et al. | 713/202 |
| 5,587,703 A | * | 12/1996 | Dumont | 340/568.2 |
| 5,635,906 A | * | 6/1997 | Joseph | 340/572.3 |
| 5,978,772 A | * | 11/1999 | Mold | 705/16 |
| 6,114,961 A | * | 9/2000 | Denholm et al. | 340/572.3 |
| 6,154,135 A | * | 11/2000 | Kane et al. | 340/572.3 |
| 6,206,285 B1 | * | 3/2001 | Baitz et al. | 235/380 |
| 6,281,796 B1 | * | 8/2001 | Canipe et al. | 248/187.1 |
| 6,595,421 B2 | * | 7/2003 | Detwiler | 235/462.14 |
| 6,598,791 B2 | * | 7/2003 | Bellis et al. | 235/383 |

FOREIGN PATENT DOCUMENTS

WO    WO 85/02285    5/1985

* cited by examiner

Primary Examiner—Michael G. Lee
Assistant Examiner—Ahshik Kim
(74) Attorney, Agent, or Firm—Paul W. Martin; Priest & Goldstein, PLLC

(57) ABSTRACT

A checkout device with a barcode reader, scale, and electronic article surveillance (EAS) system. The checkout device includes a scale assembly including a base portion and a weigh scale over the base portion. The weigh plate includes an aperture. A barcode reader is between the base portion and the weight scale and reads a barcode through the aperture in the weigh plate. A security label deactivation system is between the base portion and the weigh plate.

17 Claims, 4 Drawing Sheets

CHECKOUT DEVICE INCLUDING INTEGRATED BARCODE READER, SCALE, AND EAS SYSTEM

BACKGROUND OF THE INVENTION

The present invention relates to product checkout devices and more specifically to a checkout device including integrated barcode reader, scale, and electronic article surveillance (EAS) system.

Common checkout devices include combinations of barcode readers and scales. One example of such a checkout device is the NCR 7875 checkout device.

Another example of a checkout device includes a barcode reader and an integrated EAS system and is illustrated in U.S. Pat. No. 5,059,951.

It would be desirable to produce a checkout device with an integrated barcode reader, scale, and EAS system.

SUMMARY OF THE INVENTION

In accordance with the teachings of the present invention, a checkout device including an integrated barcode reader, scale, and electronic article surveillance (EAS) is provided.

The checkout device includes a scale assembly including a base portion and a weigh scale over the base portion. The weigh plate includes an aperture. A barcode reader is between the base portion and the weight scale and reads a barcode through the aperture in the weigh plate. A security label deactivation system is between the base portion and the weigh plate.

The checkout device may be coupled to a point-of-sale (POS) terminal that provides both power and data connections to both the barcode reader and the scale assembly.

A checkout method includes the steps of reading a barcode label on an item moving in a path, which crosses an aperture of a scale weigh plate by a barcode reader between the aperture and a scale base portion, sending a signal to an interlock by the barcode reader, enabling a security label deactivation system between the scale weigh plate and the scale base portion and in a downstream position from the barcode reader relative to the path of the item, detecting a security label on the item by the security label deactivation system as the item moves along the path and crosses the security label deactivation system, and deactivating the security label by the security label deactivation system.

It is accordingly an object of the present invention to provide a checkout device including a barcode reader, scale, and an electronic article surveillance EAS system.

It is another object of the present invention to provide a method of integrating a barcode reader, scale, and an electronic article surveillance EAS system into a single checkout device.

It is another object of the present invention to provide a method of integrating a barcode reader and an electronic article surveillance system into a scale assembly.

It is another object of the present invention to provide a checkout device with integrated barcode reader, scale, and electronic article surveillance system that is modular in nature.

It is another object of the present invention to provide a checkout method involving a checkout device which includes an integrated barcode reader, scale, and electronic article surveillance system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
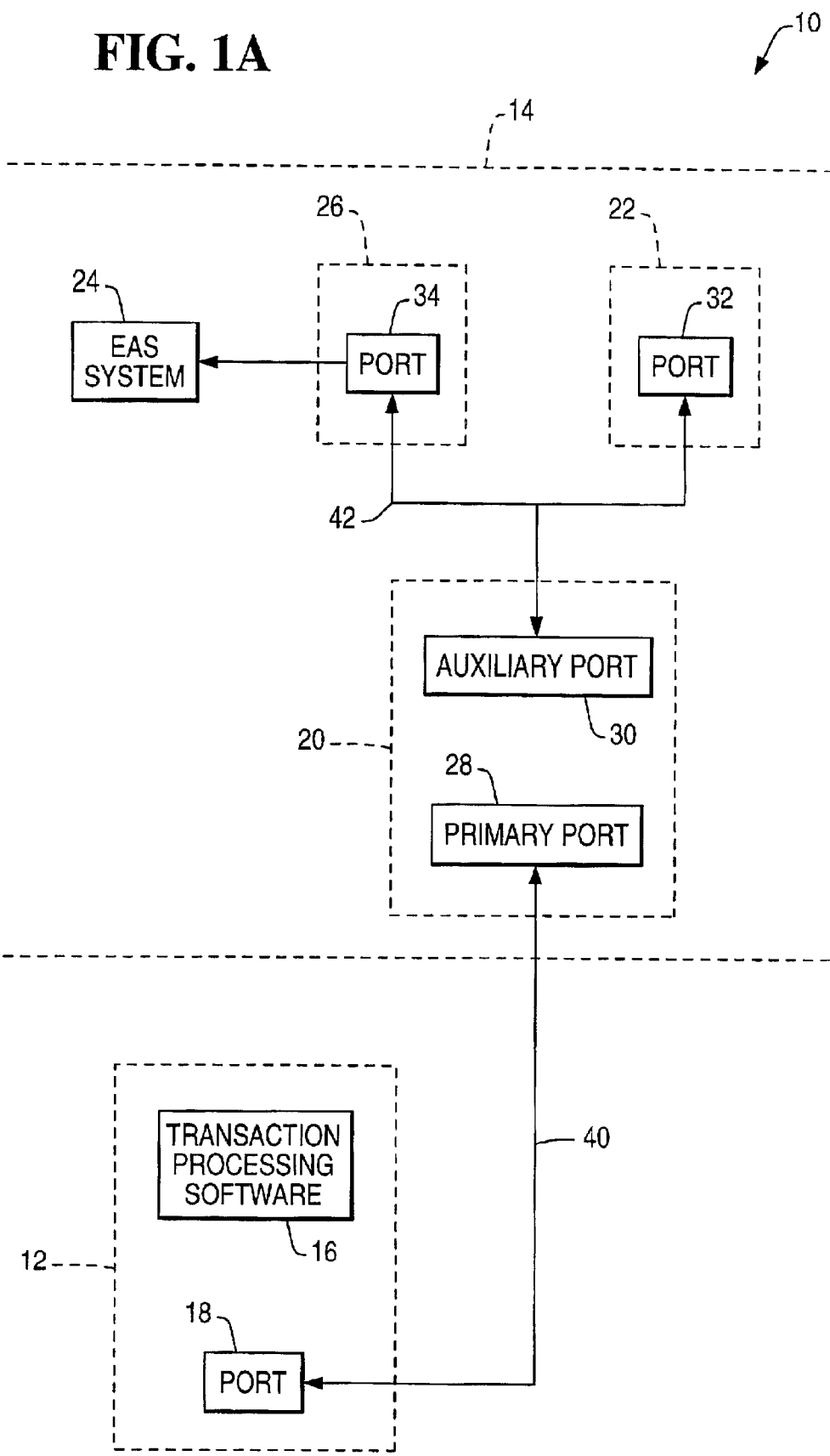
FIGS. 1A and 1B are block diagrams first and second examples of a checkout system.
Figure 1B:
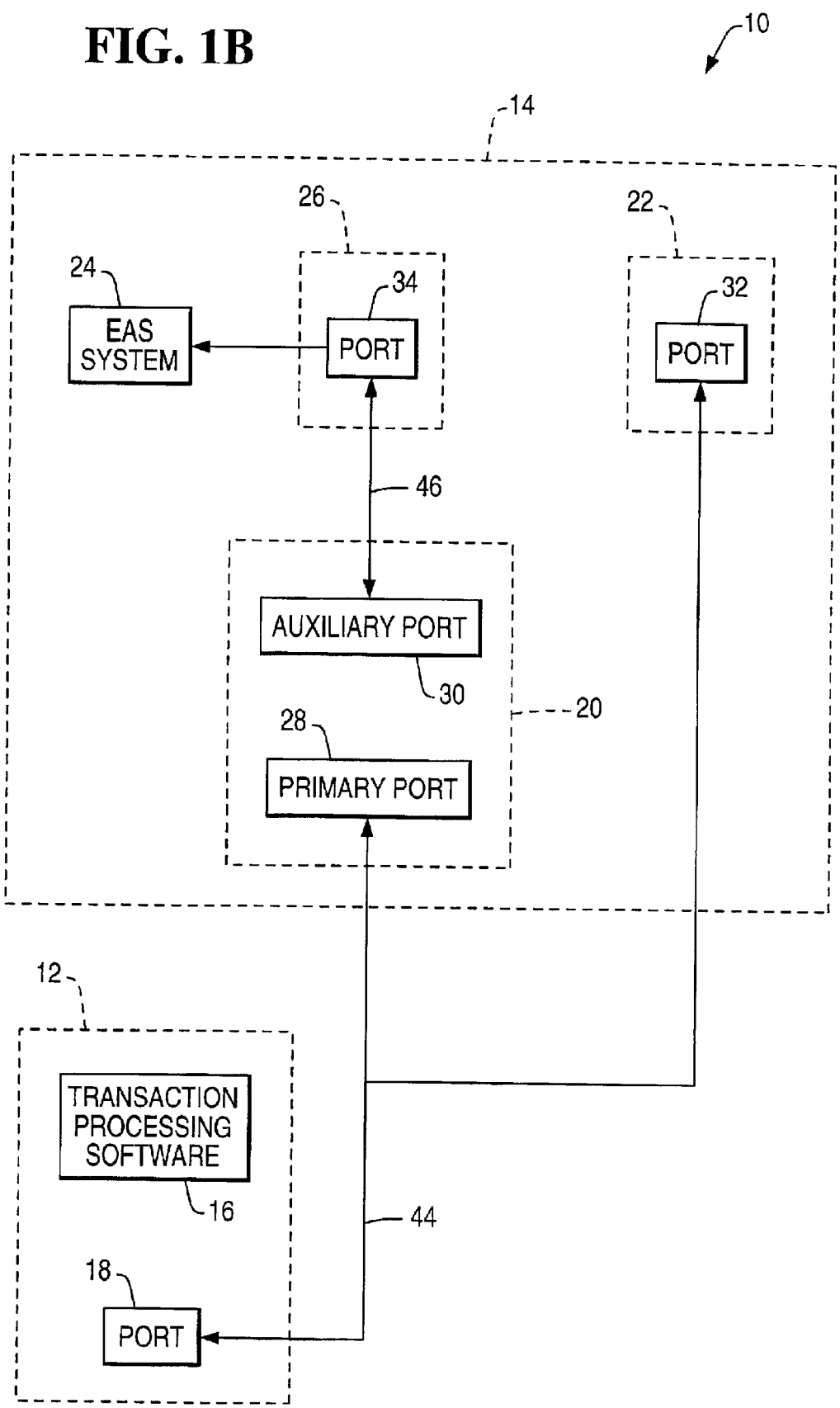

Referring now to FIGS. 1A and 1B, checkout system 10 includes point-of-sale (POS) terminal 12 and checkout device 14.

POS terminal 12 executes transaction processing software 16, which records items for purchase and records payment for the items.

POS terminal 12 additionally includes port 18 to which checkout device 14 is connected. Port 18 may be a serial port, such as an RS232 serial port.

Checkout device 14 primarily includes barcode reader 20, scale 22, and electronic article surveillance (EAS) system 24.

Barcode reader 20 reads barcode labels on purchased items. Barcode reader 20 also sends an enable signal to EAS system 24 through interlock 26 following reading. Barcode reader 20 preferably includes primary port 28 for connection barcode reader 20 to port 18 of POS terminal 12. In addition, barcode reader 20 preferably includes auxiliary port 30 to which other peripherals, such as scale 22 are connected. Primary and auxiliary ports 28 and 30 may be serial ports, such as RS232 serial ports. Barcode reader 20 may include an NCR model 7882 barcode reader.

Scale 22 weighs purchased produce items. Scale 22 may include a Mettler Toledo model MT8217AS scale.

EAS system 24 deactivates security labels on purchased items that have them. EAS system 24 senses the presence of a security label and deactivates the security label. EAS system 24 may be connected to auxiliary port 30 or to interlock 26. If present, interlock 26 activates EAS system 24 in response to an enable system from barcode reader 20. Thus, interlock 26 signals EAS system 24 to detect a security label only if barcode reader 20 has read a barcode label.

POS terminal 12 and checkout device 14 may be coupled in various ways. In a first example embodiment (FIG. 1A), cable 40 couples port 18 of POS terminal 12 to primary port 28 of barcode reader 20. Cable 42 couples auxiliary port 30 of barcode reader 20 to port 32 of scale 22 and port 34 of interlock 26.

Under this example, cables 40 and 42 supply data. Cable 42 additionally supplies power to scale 22 from barcode reader 20.

Multiple power connections supply power. POS terminal 12 and barcode reader 20 have their own power connections. Interlock 26 and EAS system 24 share another power connection.

In a second example embodiment (FIG. 1B), cable 44 couples port 18 of POS terminal 12 to port 28 of barcode reader 20 and port 32 of scale 22. Cable 44 supplies power to both barcode reader 20 and scale 22 from POS terminal 12. Thus, one less power connection is required in this example. Different terminal configurations of cable 44 are envisioned. One configuration was designed for the IBM model 46XX terminal (FIG. 2).

Figure 2:
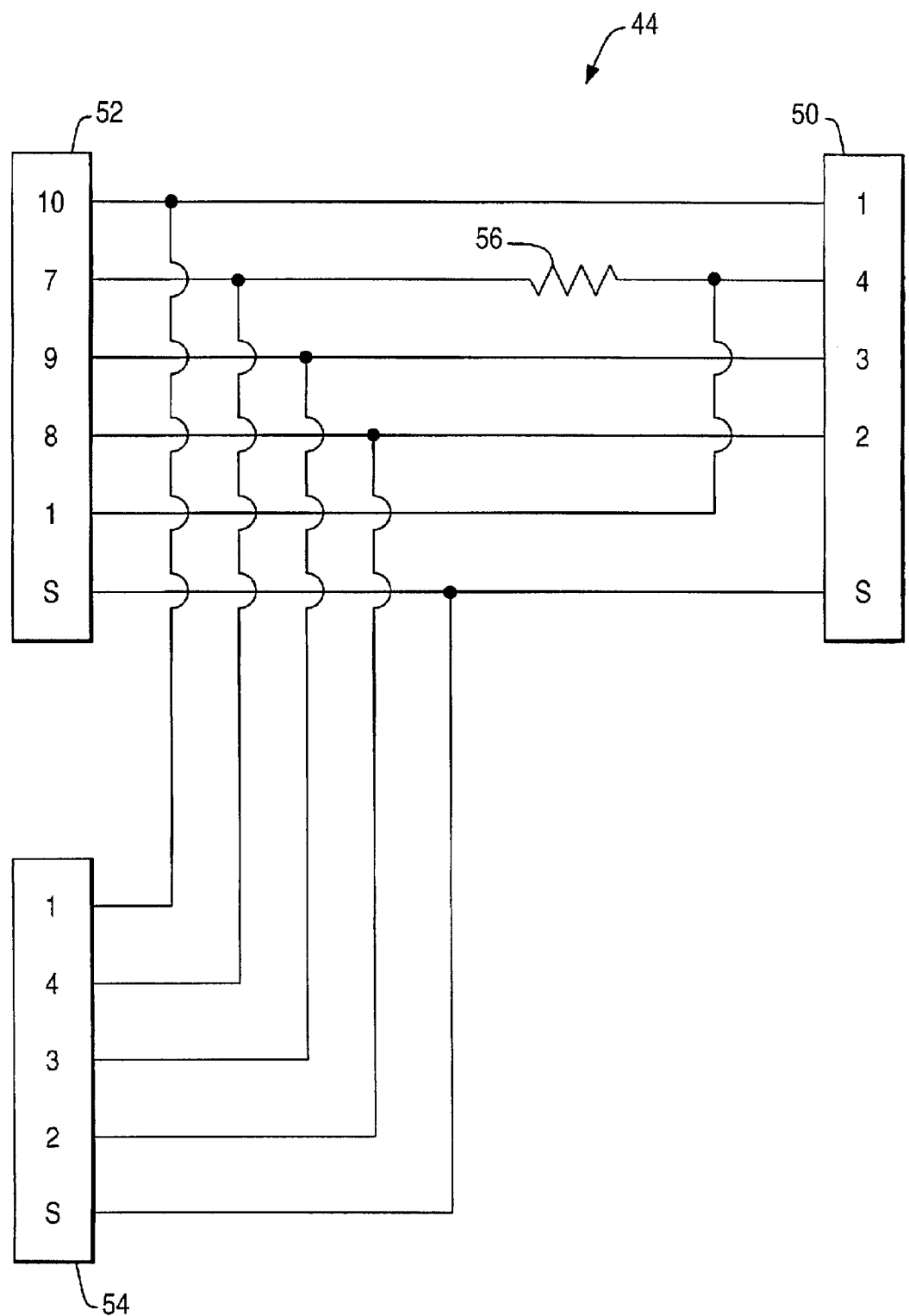
FIG. 2 is a wiring diagram of an example cable connecting a POS terminal to a barcode reader and a scale in accordance with the second example of the present invention.

Turning now to FIG. 2, cable 44 is shown in detail. Connector 50 couples to a corresponding connector in port 18 of POS terminal 12. Connector 52 couples to a corresponding connector in port 28 of barcode reader 20. Finally, connector 54 couples to a corresponding connector in port 32 of scale 22.

Table I below identifies the function of the pins in connector 50:

TABLE I

| Pin | Function |
| --- | --- |
| 1 | Logic and Power Ground |
| 4 | Terminal Power (connection OK) |
| 3 | Data signal + (bi-directional) |
| 2 | Data signal − (bi-directional) |
| S | DC Power +12 volts |

Resistor 56 limits the current flowing from POS terminal to peripherals.

Figure 3:
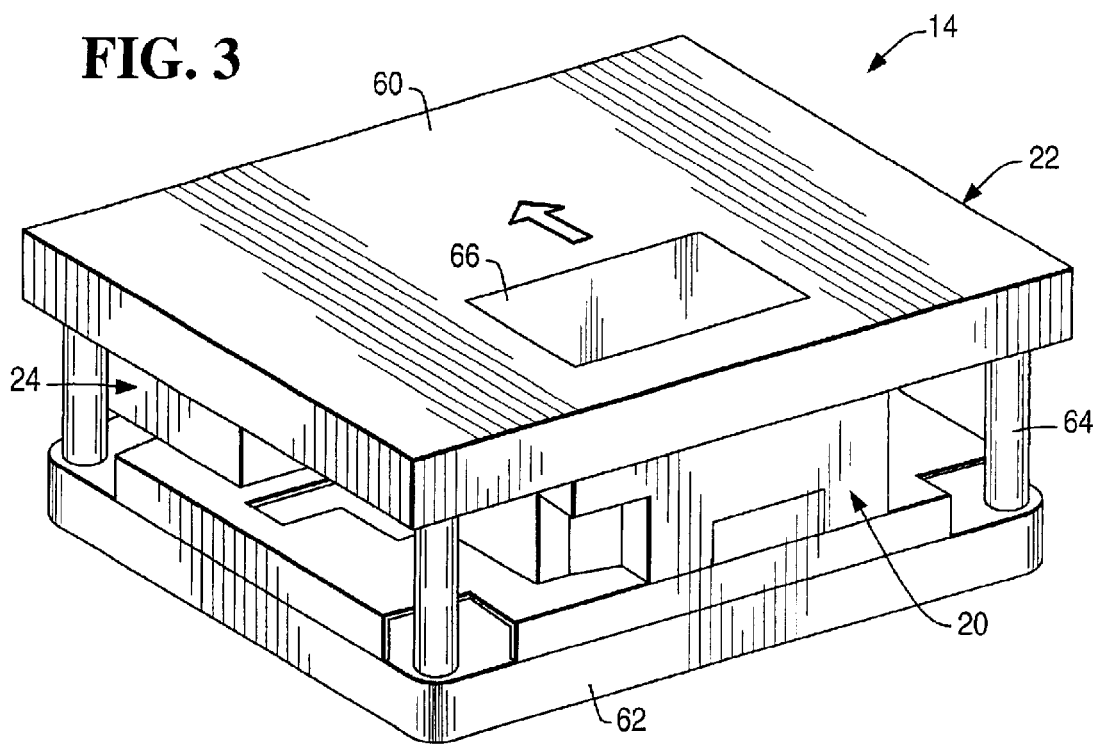
FIG. 3 is a exterior perspective view of a checkout device.
Figure 4:
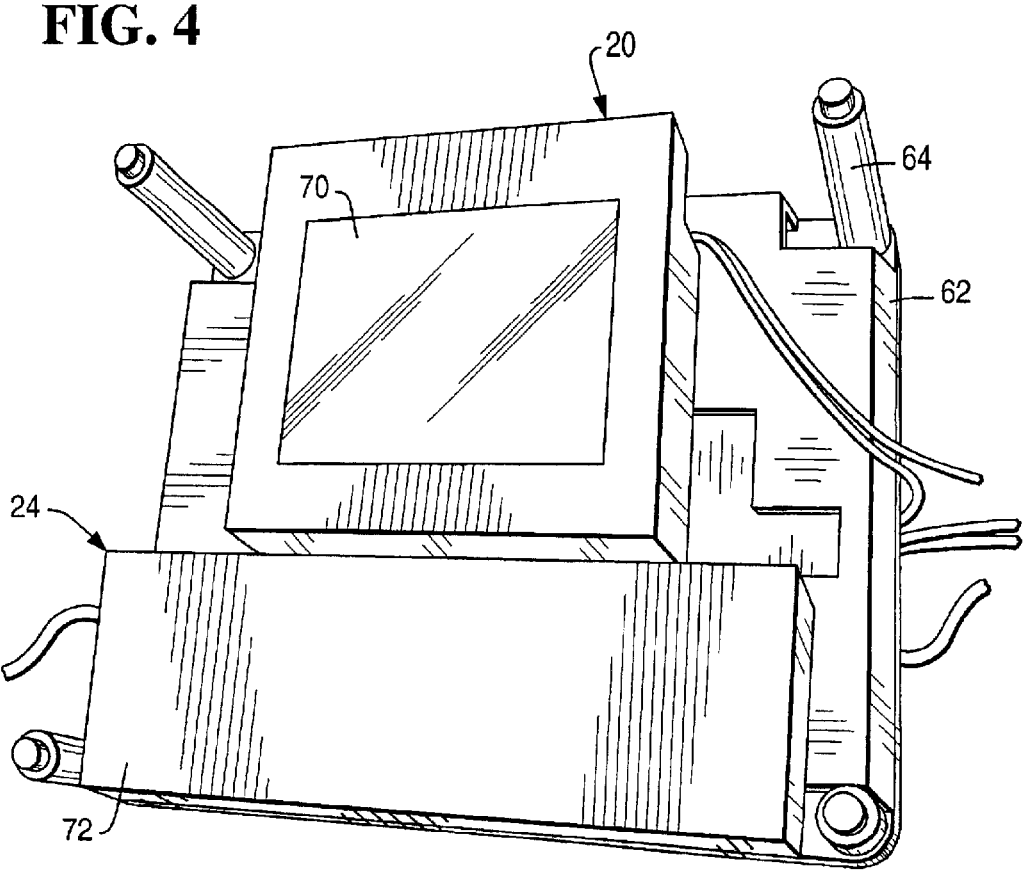
FIG. 4 is a interior view of the checkout device with the scale weigh plate removed.

Turning now to FIGS. 3 and 4, checkout device 14 is shown in more detail.

Scale 22 includes weigh plate 60, base portion 62, and (4) weigh plate support posts 64. Barcode reader 20 and EAS system 24 are sandwiched between base portion 62 and weigh plate 60. Weigh plate supports 64 float on a load cell assembly within base portion 62.

Weigh plate 60 includes window 66, which is substantially aligned with window 70 of barcode reader 20. Barcode reader 20 reads barcode labels on items above weigh plate 60 through window 66.

An example EAS system 24 includes electromagnetic coil 72. Coil 72 may include separate sense and deactivation coils. Corresponding security labels on products include magnetic material. Coil 72 is packaged into a generally rectangular in shape and positioned adjacent barcode reader 20. When mounted in a checkout counter, coil 72 is preferably oriented so that its length dimension is oriented perpendicular to the direction of product movement (arrow). In this way, security labels are exposed to the electromagnetic field from coil 72 after they are moved across window 66.

Checkout device 14 is preferably about 11.5 inches in width by 20 inches in length. Advantageously, checkout device 14 fits within a "standard" U.S. checkstand hole for combination barcode reader and scale assemblies.

In operation, a product bearing a barcode label and a product security label are moved across weigh plate 60 with the barcode label aimed at window 66. Barcode reader 20 reads the barcode label and sends an enable signal to interlock 26. Interlock 26 signals EAS system 24 to detect the product security label. Coil 72 senses the magnetic material in the security label. Coil 72 demagnetizes the magnetic material in the security label.

Although the invention has been described with particular reference to certain preferred embodiments thereof, variations and modifications of the present invention can be effected within the spirit and scope of the following claims.

What is claimed is:

1. A checkout device comprising:
    a scale assembly including a base portion and a weigh plate over the base portion;
    wherein the weigh plate includes an aperture;
    a barcode reader between the base portion and the weight plate, the barcode reader reading a barcode affixed to an item through the aperture in the weigh plate; and
    a security label deactivation system between the base portion and the weigh plate which deactivates a security label affixed to the item after the barcode is read by the barcode reader, the security label deactivation system integrated within the scale assembly.

2. The checkout device as recited in claim 1, wherein the barcode reader enables the security label deactivation system following reading of the barcode.

3. The checkout device as recited in claim 1, wherein the security label deactivation system includes a magnetic coil assembly for sensing and deactivating the security label.

4. The checkout device as recited in claim 3, wherein the barcode reader reads the barcode before the magnetic coil assembly senses and deactivates the security label.

5. The checkout device as recited in claim 1, further comprising an interlock which enables the security label deactivation system following reading of the barcode.

6. The checkout device as recited in claim 1, wherein the scale assembly fits within a checkstand hole measuring about 11.5 inches by 20 inches.

7. The checkout device of claim 1 wherein the security label deactivation system is activated as the item travels along a path which crosses the aperture and continues above the plane of the weigh plate, in response to an enabling signal seat by the bar code reader upon a successful read of the bar code affixed to the item, the security label deactivation system operating to deactivate the security label affixed to the item while the item continues traveling along the path.

8. The checkout device of claim 1 further comprising:
    an interlock for activating the security label deactivation system, as the item travels along a path which crosses the aperture for the barcode reader in response to a successful read of the barcode affixed to the item, the interlock activating the security label deactivation system in response to an enable signal transmitted by the barcode reader, the activated security label deactivation system operating to deactivate the security label affixed to the item while the item continues traveling along the path.

9. The checkout device of claim 1 wherein the bar code reader reads the bar code affixed to the item and the security label deactivation system deactivates the security label affixed to the item within the time it takes to pass the item along a path which crosses the aperture and continues above the plane of the weigh plate.

10. A checkout system comprising:
    a checkout device including
        a scale assembly including a base portion and weigh plate over the base portion; wherein the weigh plate includes an aperture;
        a barcode reader between the base portion and the weigh plate, the barcode reader reading a barcode affixed to an item through the aperture in the weigh plate; and
        a security label deactivation system between the base portion and the weight scale which deactivates a security label affixed to the item after the barcode is read by the barcode reader, the security label deactivation system integrated within the scale assembly;
    a transaction terminal; and
    a cable coupling the checkout device to the transaction terminal, including lines for providing power to the barcode reader and the scale assembly.

11. The checkout system as recited in claim 10, wherein the cable further comprises additional lines for carrying data between the transaction terminal and the barcode reader and between the transaction terminal and the scale.

12. The checkout system as recited in claim 10, wherein the cable is a Y-shaped cable.

13. The checkout system as recited in claim 12, wherein the barcode reader includes first and second ports.

14. The checkout system as recited in claim 13, wherein the Y-shaped cable includes a first connector which is coupled to a third port of the transaction terminal, a second connector which is coupled to the first port of the barcode reader, and a third connector which is coupled to a fourth port of the scale assembly.

15. A checkout method comprising the steps of:

reading a barcode label on an item moving, in a path, which crosses an aperture of a scale weigh plate by a barcode reader between the aperture and a scale base portion;

sending a signal to an interlock by the barcode reader;

enabling a security label deactivation system between the scale weigh plate and the scale base portion and in a downstream position from the barcode reader relative to the path of the item, the security label deactivation system integrated within the scale weigh plate and the scale base portion;

detecting a security label on the item by the security lapel deactivation system as the item moves along the path and crosses the security label deactivation system; and deactivating the security label by the security label deactivation system.

16. The method as recited in claim 15, wherein the detecting step comprises the substeps of:

sensing movement of a magnetic material in the security label as it passes near a coil assembly in the security label deactivation system.

17. The method as recited in claim 15, wherein the detecting step comprises the substeps of:

demagnetizing a magnetic material in the security label as it passes near a coil assembly in the security label deactivation system.

\* \* \* \* \*

Adverse Decision In Interference

Patent No. 6,854,647, Donald A. Collins, Daniel B. Seevers, Wayne L. Orwig, Scott B. Henry, CHECKOUT DEVICE INCLUDING INTEGRATED BARCODE READER, SCALE, AND EAS SYSTEM, Interference No. 105,327, final judgment adverse to the patentees rendered, March 16, 2006, as to claims 1-17.

*(Official Gazette September 19, 2006)*